(12) United States Patent  (10) Patent No.: US 9,075,763 B2
Cornwell et al.  (45) Date of Patent: Jul. 7, 2015

(54) MERGING COMMAND SEQUENCES FOR MEMORY OPERATIONS

(75) Inventors: Michael J. Cornwell, San Jose, CA (US); Christopher P. Dudte, San Jose, CA (US); Thomas R. Colligan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 13/453,605

(22) Filed: Apr. 23, 2012

(65) Prior Publication Data

US 2012/0260026 A1  Oct. 11, 2012

Related U.S. Application Data

(63) Continuation of application No. 13/205,467, filed on Aug. 8, 2011, now Pat. No. 8,166,236, which is a continuation of application No. 11/739,878, filed on Apr. 25, 2007, now Pat. No. 7,996,599.

(51) Int. Cl.
  *G06F 12/00* (2006.01)
  *G06F 13/16* (2006.01)
  *G06F 3/06* (2006.01)

(52) U.S. Cl.
  CPC ............ *G06F 13/1642* (2013.01); *G06F 3/061* (2013.01); *G06F 3/0659* (2013.01); *G06F 3/0688* (2013.01)

(58) Field of Classification Search
  USPC ........................................................ 711/103
  See application file for complete search history.

(56) References Cited

U.S. PATENT DOCUMENTS

| 5,509,134 | A |   | 4/1996  | Fandrich et al. |
|-----------|---|---|---------|-----------------|
| 5,586,291 | A | * | 12/1996 | Lasker et al. ................. 711/113 |
| 5,602,987 | A |   | 2/1997  | Harari et al. |
| 5,638,534 | A |   | 6/1997  | Mote, Jr. |
| 5,671,229 | A |   | 9/1997  | Harari et al. |
| 5,719,808 | A |   | 2/1998  | Harari et al. |
| 5,870,625 | A | * | 2/1999  | Chan et al. ........................ 710/5 |
| 5,943,692 | A | * | 8/1999  | Marberg et al. ............... 711/203 |
| 6,047,334 | A |   | 4/2000  | Langendorf et al. |
| 6,112,265 | A |   | 8/2000  | Harriman et al. |
| 6,149,316 | A |   | 11/2000 | Harari et al. |
| 6,426,893 | B1 |  | 7/2002  | Conley et al. |
| 6,684,301 | B1 |  | 1/2004  | Martin |
| 6,721,820 | B2 |  | 4/2004  | Zilberman et al. |
| 6,757,842 | B2 |  | 6/2004  | Harari et al. |
| 6,763,424 | B2 |  | 7/2004  | Conley |
| 6,914,846 | B2 |  | 7/2005  | Harari et al. |
| 6,931,501 | B1 |  | 8/2005  | Narayanaswamy et al. |

(Continued)

OTHER PUBLICATIONS

Office Action from European Patent Application No. 08 746 818.7-1956, mailed Aug. 8, 2013, pp. 1-5.

(Continued)

*Primary Examiner* — Charles Rones
*Assistant Examiner* — Nanci Wong
(74) *Attorney, Agent, or Firm* — Meyertons, Hood, Kivlin, Kowert & Goetzel, P.C.

(57) ABSTRACT

Systems and processes may include a memory coupled to a memory controller. Command signals for performing memory access operations may be received. Attributes of the command signals, such as type, time lapsed since receipt, and relatedness to other command signals, may be determined. Command signals may be sequenced in a sequence of execution based on the attributes. Command signals may be executed in the sequence of execution.

21 Claims, 6 Drawing Sheets

(56) References Cited

U.S. PATENT DOCUMENTS

| | | | |
|---|---|---|---|
| 6,947,332 B2 | 9/2005 | Wallace et al. | |
| 7,128,110 B2 | 10/2006 | Yamazaki et al. | |
| 7,137,011 B1 | 11/2006 | Harari et al. | |
| 7,162,569 B2 | 1/2007 | Conley et al. | |
| 7,237,046 B2 | 6/2007 | Paley et al. | |
| 7,237,074 B2 | 6/2007 | Guterman et al. | |
| 7,240,219 B2 | 7/2007 | Teicher et al. | |
| 7,370,331 B2 | 5/2008 | Brenner | |
| 7,417,637 B1 | 8/2008 | Donham et al. | |
| 7,463,521 B2* | 12/2008 | Li | 365/185.12 |
| 7,493,456 B2* | 2/2009 | Brittain et al. | 711/154 |
| 2002/0138676 A1 | 9/2002 | Kendall et al. | |
| 2002/0141244 A1* | 10/2002 | Bruce et al. | 365/185.33 |
| 2003/0217239 A1 | 11/2003 | Jeddeloh | |
| 2004/0103242 A1 | 5/2004 | Teng | |
| 2004/0148470 A1* | 7/2004 | Schulz | 711/137 |
| 2004/0225847 A1 | 11/2004 | Wastlick et al. | |
| 2005/0120146 A1 | 6/2005 | Chen et al. | |
| 2005/0172092 A1* | 8/2005 | Lam et al. | 711/161 |
| 2006/0106980 A1* | 5/2006 | Kobayashi et al. | 711/113 |
| 2006/0112240 A1 | 5/2006 | Walker et al. | |
| 2006/0239080 A1 | 10/2006 | Li | |
| 2007/0028034 A1* | 2/2007 | Nishihara | 711/103 |
| 2007/0066119 A1 | 3/2007 | Wu et al. | |
| 2007/0226050 A1* | 9/2007 | Di Mario | 705/11 |
| 2009/0055576 A1* | 2/2009 | Nakanishi et al. | 711/103 |
| 2010/0185808 A1 | 7/2010 | Yu et al. | |

OTHER PUBLICATIONS

Notification of Transmittal of the International Search Report and the Written Opinion of the International Searching Authority of Application No. PCT/US2008/061467 filed Apr. 24, 2008 and mailed Feb. 9, 2009, 18 pages.

International Preliminary Report on Patentability issued in International Application No. PCT/US2008/061467, mailed on Nov. 5, 2009, 10 pages.

Communication pursuant to Article 94(3) EPC issued in Application No. 08 746 818.7-2212, dated Nov. 19, 2010, 6 pages.

Office Action from European Patent Application No. 08746818.7, dated Jan. 17, 2014, pp. 1-5.

* cited by examiner

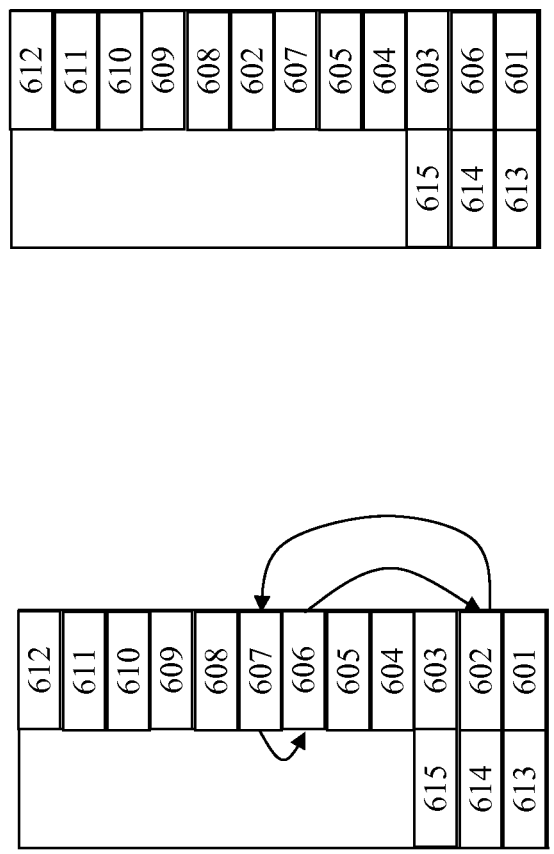

MERGING COMMAND SEQUENCES FOR MEMORY OPERATIONS

CLAIM OF PRIORITY

This application is a continuation application of and claims priority under 35 USC §120 to U.S. patent application Ser. No. 13/205,467, filed on Aug. 8, 2011, which is a continuation application of and claims priority under 35 USC §120 to U.S. Pat. No. 7,996,599, issued on Aug. 9, 2011, the entire contents of which are hereby incorporated by reference.

TECHNICAL FIELD

The present invention relates to managing memory, and more particularly to combining commands in memory management.

BACKGROUND

Currently, parallel ATA buses are often used to transmit command signals for memory access operations to a memory controller. Parallel ATAs require command signals to be executed prior to transmitting the next command for execution. Executing the command signals sequentially in the order received may result in inefficiencies. Command signals (e.g., read commands) with low execution times may be held in the queue for execution while waiting for long processes (e.g., write commands) to be completed.

SUMMARY

Command signals for memory access operations may be received by a memory controller or a processor of a host. Command signals may be resequenced to increase performance of a memory, decrease memory processing times, and/or increase a life cycle of a memory (e.g., by reducing writes or erases to a block of a memory).

In one general aspect, command signals for performing memory access operations may be received in a first sequence, one or more attributes of the command signals may be determined, a second sequence of execution for one or more of the command signals may be determined at least partially based on at least one of the attributes.

Implementations may include one or more of the following features. Command signals may include read commands and/or write commands. Read commands may be promoted in the sequence of execution over write commands. Attributes may include an execution time. Command signals with shorter execution times may be promoted in a sequence of execution over command signals with longer execution times. It may be determined if two or more of the command signals are related. Related command signals may be positioned sequentially (e.g., consecutively) in the sequence of execution. Related command signals may be consolidated. Command signals may be received via a serial ATA bus. One or more command signals may be executed in the determined second sequence. Attributes may include time lapsed from receipt of the command signal, and the second sequence may be determined at least partially based on the time lapsed from receipt of the command signal.

In another general aspect, a first sequence of command signals for performing memory access operations may be detected, one or more attributes of the command signals may be determined, a second sequence of execution for the command signals may be determined at least partially based on at least one of the attributes.

Implementations may include one or more of the following features. One or more of the command signals may be executed in the second sequence of execution. Read commands may be executed over another type of command in the second sequence of execution. Related command signals may be identified and positioned sequentially in the second sequence.

In another general aspect, systems may include a first memory operable to store command signals for performing memory access operations on a second memory and a memory controller. Memory controller may execute command signals on the second memory, determine attribute(s) of the command signals, and/or determine a sequence of execution for the command signals at least partially based on at least one of the attributes.

Implementations may include one or more of the following features. A serial ATA bus may be operable to transmit command signals to the memory controller. The first memory may be a buffer, where the buffer may be coupled to the memory controller. The second memory may include an electrically erasable memory.

The details of one or more implementations are set forth in the accompanying drawings and the description below. Other features will be apparent from the description, the drawings, and from the claims.

DESCRIPTION OF DRAWINGS

FIG. 6 illustrates an example resequencing of command signals.

Like reference symbols in the various drawings indicate like elements.

DETAILED DESCRIPTION

Figure 1:
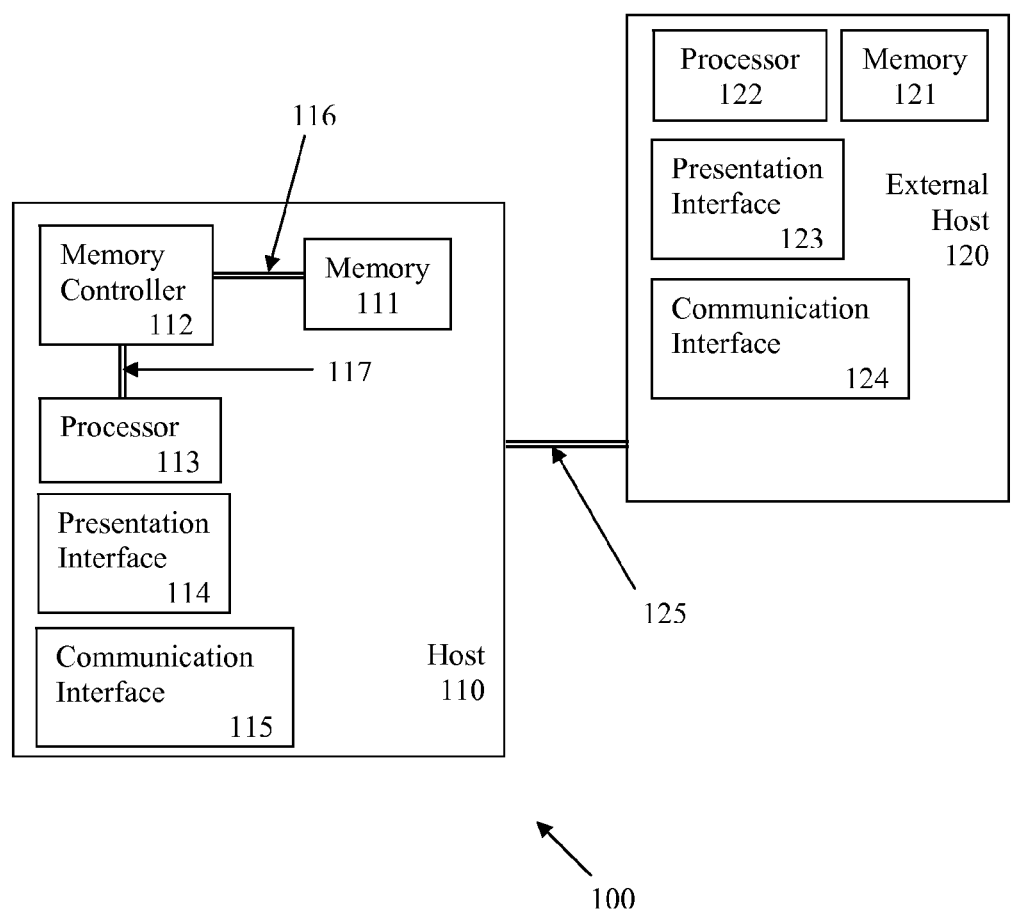
FIG. 1 illustrates examples of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may be individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), phase-change memory (PRAM), and/or any other memory that does not need its memory contents periodically refreshed and/or can retain information without power. Memory 111 may be memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the block in which the cell resides.

Figure 2:
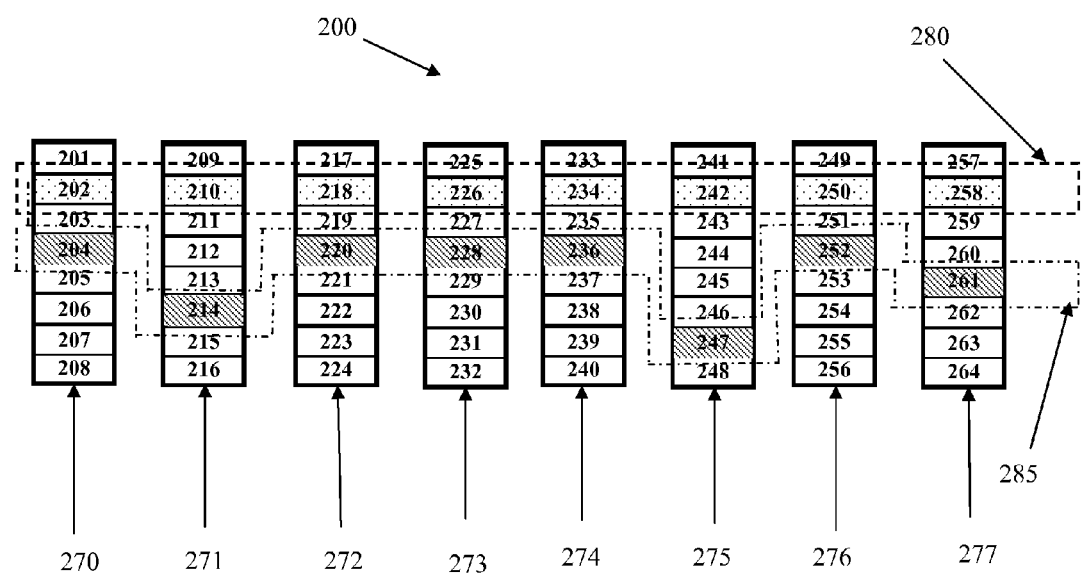
FIG. 2 illustrates an example configuration of a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216.

During operation, one or more memory 111 may receive signals from memory controller 112 over Input/Output (I/O) bus 116, which enables memory 111 to perform memory access requests (e.g., read or write operations), see FIG. 1. Memory 111 may be interleaved, so that read or write requests to logical block addresses 280, 285 (LBAs) are mapped to physical memory addresses that include two or more physical blocks 270-277, see FIGS. 1 and 2. Interleaving may increase performance (e.g., increase read and/or write times) of memory 111. Host 110 may perform reads and writes to LBAs 280, 285, which are mapped or translated to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. Mapping may make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs in increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Buses 116 and 117 may be an Integrated Drive Electronics (IDE)/Advanced Technology Attachment (ATA) bus that translates control, address and data signals into memory access requests using IDE/ATA standard bus protocol (e.g., ATA-6 bus protocol). IDE/ATA signals may be generated by processor 113.

Processor 113 may include a programmable logic device, a microprocessor, or any other appropriate device for manipulating information in a logical manner. A processor may execute the operating system for the host. An example of processor 113 is a PP5002 Superintegration™ SoC controller manufactured by PortalPlayer, Inc. (San Jose, Calif.). The PP5002 controller may provide a platform for media player/recorder systems and/or other products that use non-volatile memory.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

During use, an application running on processor 113 may request access to data stored on memory 111, see FIG. 1. For example, a user of a host 110 (e.g., a media player/recorder) may request to save a song to memory 111. A media player/recorder application may send the request to an operating system, which formats the request into IDE/ATA signals. IDE/ATA signals may be transmitted to memory controller 112 on bus 117 by processor 113. Memory controller 112 may translate the request to access memory 111 via bus 116.

Presentation interface 114 may present data. For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 and/or received data from external host 120 via network protocols (e.g., TCP/IP, Bluetooth, and/or Wi-Fi) and/or a bus (e.g., serial, parallel, USB, and/or FireWire).

Figure 3:
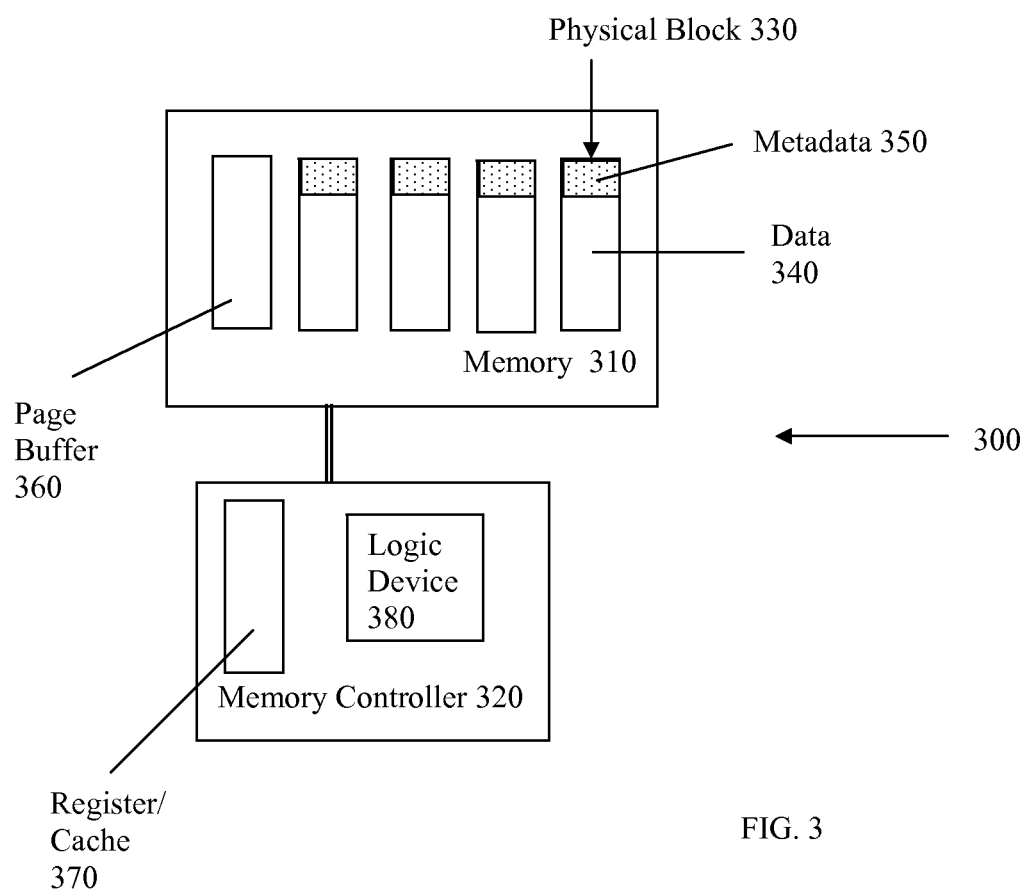
FIG. 3 illustrates an example of a memory controller coupled to a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. A portion of memory 310 may be a first buffer 360 (e.g., a page buffer). For example, one or more blocks 330 of a memory may be a first buffer 360. First buffer 360 may be a portion of one or more blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360, 370 to facilitate operations (e.g., read or write), facilitate random data access operations, and/or increase performance. For example, memory controller 320 may read data from memory 310. Data from data portion 340 of memory 310 may be transmitted to first buffer 370 (e.g., data register or page register). First buffer 360 may transmit the data in the first buffer to second buffer 370 (e.g., cache, register, or cache register) which is coupled to memory controller 320. Memory controller 320 and/or a processor of the host may read data from second buffer 370. While or after data is transferred from first buffer 360 to second buffer 370, additional data may be transferred from data portions 340 of memory 310 to the first buffer. Utilizing at least a double buffer system may make read times appear shorter to a user.

Utilizing at least two buffers may also improve performance during program operations. Memory controller 320 may input data received from a host or external host into second buffer 370 (e.g., cache). Programming of the array may be supplied by first buffer 360. Since first buffer 360 maintains data through the programming cycle, second buffer 370 may receive a next portion of data from memory controller 320. Utilizing at least a double buffer system may make programming time appear shorter to a user.

Utilizing at least two buffers may also facilitate movement of data within memory 310. Data from data portions 340 may be transmitted to a first buffer 360 and then transmitted back to a different data portion without requiring use of the second buffer 370. Use of the second buffer while moving data within memory 310 may inhibit the processor of the host from performing other operations (e.g., when second buffer is the cache for the processor) and/or inhibit use of the bus connecting the memory and the memory controller and/or processor by other operations.

Although the above describes portions of the block as for data and/or for metadata, portions of a block may not be fixed. Portion of the block may include metadata and at other times include data. Furthermore, memory controller may be integrated or a component of a processor of the host.

Host 110 may be coupled to an external host 120, as illustrated in FIG. 1. Host 110 may be coupled to external host 120 to transmit and/or receive data. For example, songs and/or videos may be downloaded from external host 120 (e.g., computer) to host 110, such as a media player. As another example, application (e.g., firmware, operating systems, MP3 players, video players, upgrades, updates, and/or modifications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 via a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted via one or more network protocols (e.g., TCP/IP, Wi-Fi, 802.11 g, 802.11 n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Figure 4:
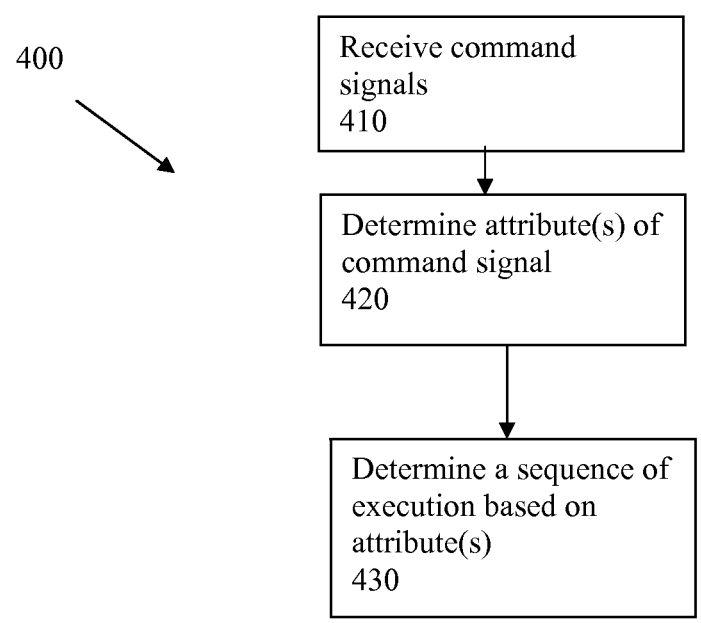
FIG. 4 illustrates an example process of a host.

FIG. 4 illustrates a process 400 of a host. Command signals for performing memory access operations may be received (operation 410). For example, command signals may include read, write, and/or erase commands. Command signals may be received in a first sequence. Command signals may be received from other devices in the host, from a user, and/or from an external host.

Command signals may be received by a memory controller via a serial ATA bus. A serial ATA bus may allow command sequencing. A serial ATA bus may couple the memory controller to the processor of the host. One or more serial ATA buses may couple the processor to other devices in the host and/or external host. Command signals may be received by other connections that allow resequencing of command signals received (e.g., command signals may not need to be executed prior to receiving other command signals).

Attribute(s) of the command signals may be determined (operation 420). Attributes may include characteristics of the command signals. For example, attributes may include the type of command (e.g., read, write, or erase), the execution time for the command, the task the command is performing (e.g., is it a step of a multi-step task), time lapsed since the command was received, and/or other command signals the command is related to (e.g., related tasks or write, read, and/or erase the same blocks and/or cells).

A sequence of execution may be determined based on attribute(s) of the command signals (operation 430). A sequence of execution may be determined periodically or continuously. For example, a memory controller may continuously sequence command signals received. As another example, a memory controller may sequence command signals and execute at least a portion of the command signals in the sequence of execution prior to resequencing the command signals.

Figure 5:
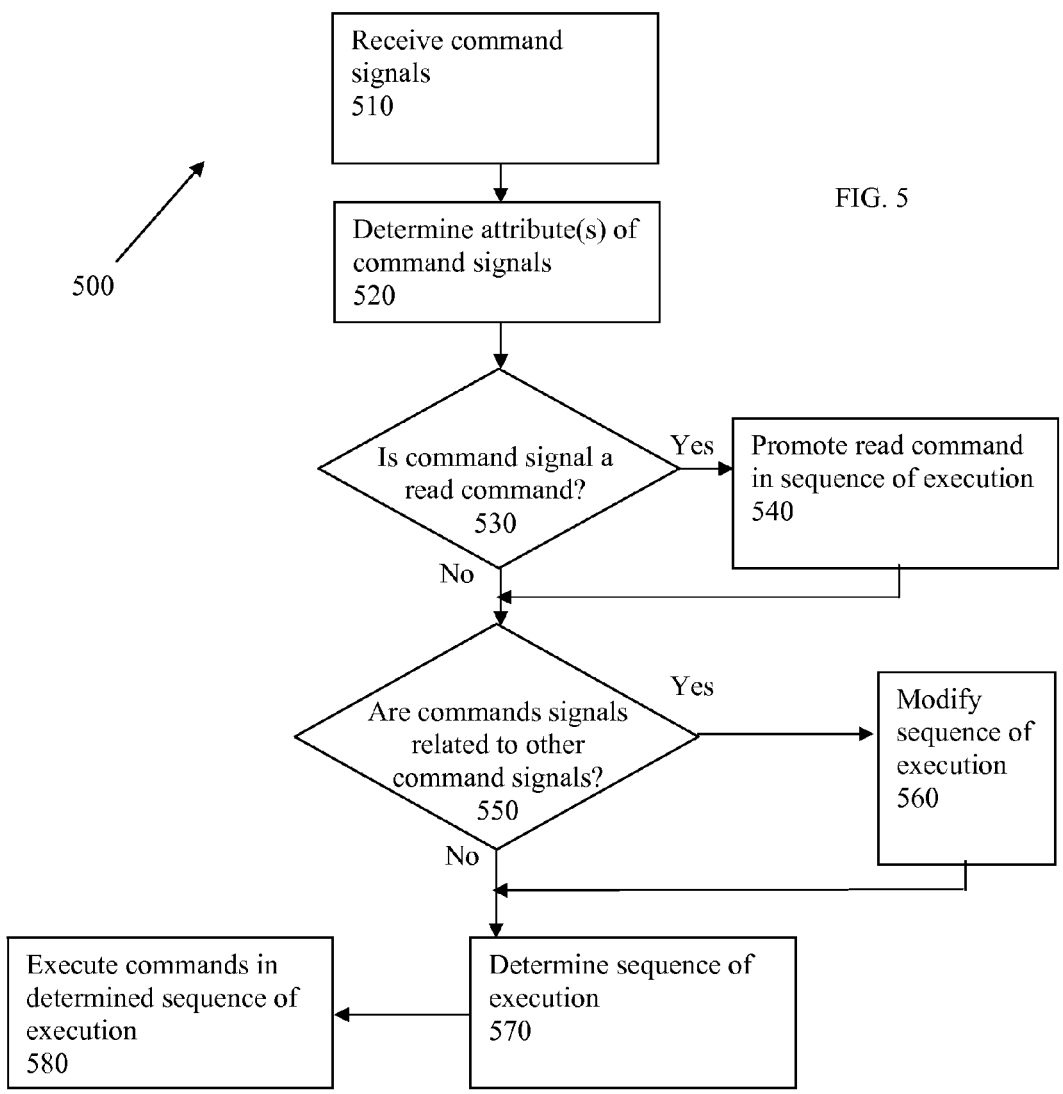
FIG. 5 illustrates an example process of resequencing command signals.

FIG. 5 illustrates an example of a process 500 for resequencing command signals. Command signals may be received (operation 510). For example, a processor or a memory controller of the host may receive command signals for performing memory access operations on a memory (e.g., nonvolatile memory, such as flash memory) of the host. Command signals may be stored in a second buffer of the system (e.g., cache). The sequence in which command signals are received may be determined.

Attribute(s) for command signals may be determined (operation 530). For example, time lapsed from receipt of a command signal may be determined. Whether the command signal is a read, a write, or an erase command may be determined. In addition, an execution time for a command signal may be determined. A command signal may include metadata that indicates attributes of the command signal. For example, metadata associated with the command signal may indicate attributes of the command signal. In some implementations, the memory controller may determine attributes of the command.

The command signals may then be sequenced in a sequence of execution based on the determined attribute(s). A determination may be made whether the command signal is a read command (operation 530). For example, the memory controller may determine whether the command signal is a read command. If the command signal is a read command, the read command may be promoted in the sequence of execution (operation 540). Read commands may be promoted over other command signals. In some implementations, read commands may have low execution times and thus promotion in the sequence allows the memory controller to quickly execute some of the command signals.

A determination may be made whether command(s) are related to other command signals (operation 550). Related command signals may include command signals that relate to a similar task or operation (e.g., multi-step operations). Related command signals may include command signals that write, read, and/or erase similar blocks and/or cells of data. A processor or a memory controller of the host may determine whether command signals are related. Metadata associated with the command signals may indicate whether the command signals are related.

If command signals are related, the sequence of execution may be modified (operation 560). For example, related command signals may be positioned sequentially (e.g., consecutively) in the sequence of execution. As another example, some command signals may be merged or deleted. As an example, command signals may include: a first command to erase data from a first cell of a block, a second command to write data to a first cell of the block, and a third command to erase data from a third cell of the block, and a fourth command to write data to a fourth cell of the block. Memory controller may merge the first and the third commands to erase the first and the third cells. In a memory in which cells are not individually erasable, only data in cells other than the first and the third cells may be stored, for later rewriting to the block, prior to erasing the block of data. In addition, the second and the fourth commands may be merged to write the first and the third cells. In some implementations, the write commands to the first and the third cells may also be merged with commands for rewriting unchanged data (e.g., cells other than the first and the third cells) so that one write command may be executed after erasing the block of the memory.

In some implementations, a command signal may be promoted after a specified period of time lapses from receipt of the command signal. When command signals are resequenced to promote read commands and/or promote command signals with short execution times, other command signals may be demoted in the sequence of execution. To inhibit command signals from residing without execution in the cache for an indefinite or prolonged period, the attribute of time lapsed from receipt may be used to promote command signals in the sequence of execution.

The sequence of execution may then be determined (operation 570). For example, after analyzing the attributes of the command signals, the sequence may be determined based on the attribute(s).

Command signals may then be executed in the determined sequence of execution (operation 580). For example, the memory controller may execute the command signals in the sequence of execution. In some implementations, one or more of the command signals in the sequence of execution may not be executed in the determined sequence. For example, the sequence of execution may be resequenced as new command signals are received and the command signals may be executed according to the new sequence. As another example, a specified number of command signals may be executed prior to resequencing the sequence of execution.

FIGS. 6A-B illustrates an example of resequencing command signals. FIG. 6A illustrates command signals 601-615 received by a first memory (e.g., cache) of a host. First memory may be coupled to a memory controller for a second memory. Command signals for memory access operations on a second memory of the host may be received in a first sequence. Attribute(s) of the command signals may be determined. Command signals may then be resequenced in a second sequence, as illustrated in FIG. 6B, at least partially based on the attribute(s). For example, command 606 may be a read command and promoted over non-read commands (e.g., command signals 603-605). Command 602 may be a write command related to command signals 608-610 and thus positioned sequentially with the related command signals.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, a processor of the host may retrieve command signals from stacks of command signals associated with other devices (e.g., applications, drives, LCDs) of the host and/or the external host. As another example, metadata associated with command signals may be analyzed to determine attribute(s) of command signals. Among other modifications, the described operations may be performed in a different order than is described and some operations may be added or deleted. For example, related command signals may not be positioned sequentially in the sequence of execution. As another example, read commands may not be promoted over other types of command signals in the sequence of execution. Furthermore, command signals may be positioned in the sequence of execution at least partially based on execution time(s). Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method for managing non-volatile memory, wherein the non-volatile memory includes a plurality of data blocks, the method comprising:
   receiving a first plurality of commands for accessing the non-volatile memory, wherein the first plurality of commands includes at least one write command and at least one erase command, wherein the at least one write command and the at least one erase command specify a selected one data block of the plurality of data blocks;
   associating two or more commands of the first plurality of commands dependent upon metadata included in each of the two or more commands of the first plurality of commands, wherein the metadata in each of the two or more commands indicates the two or more commands relate to a same multi-step operation;
   determining a second plurality of commands different from the first plurality of commands dependent upon the associated commands, wherein at least one command of the first plurality of commands is excluded from the second plurality of commands dependent upon the metadata in the at least one command;
   promoting execution of a given command from the first plurality of commands over at least one other command in the second plurality of commands in response to a determination that a time lapsed from receipt of the given command is greater than a threshold time, wherein the time lapsed from receipt of the given command is determined dependent upon metadata in the given command; and
   executing the second plurality of commands in the non-volatile memory.

2. The method of claim 1, further comprising temporarily storing data from cells in the selected one data block into available cells in the non-volatile memory prior to executing the at least one erase command.

3. The method of claim 2, further comprising:
   executing the at least one write command on the temporarily stored data to generate modified data for the selected one data block; and
   writing the modified data to the selected one data block using a single write command.

4. The method of claim 1, further comprising storing the first plurality of commands and the second plurality of commands in a buffer.

5. The method of claim 1, further comprising receiving, from a processor, the first plurality of commands and the second plurality of commands.

6. The method of claim 1, wherein the first plurality of commands is received through a serial Advanced Technology Attachment (ATA) bus.

7. The method of claim 1, wherein the multi-step operation corresponds to a request to save a file to the non-volatile memory.

8. A system, comprising:
   a buffer configured to store command signals for performing memory access operations on a non-volatile memory, wherein the non-volatile memory includes a plurality of data blocks;
   a processor configured to send commands for the non-volatile memory; and
   a memory controller configured to:
      receive a first sequence of commands for the non-volatile memory, wherein the first sequence includes at least one write command and at least one erase command, wherein the at least one write command and the at least one erase command specify a selected one data block of the plurality of data blocks;
      associate two or more commands of the first sequence of commands dependent upon metadata included in each of the two or more commands of the first sequence of commands, wherein the metadata in each of the two or more commands indicates the two or more commands relate to a same multi-step operation;
      determine a second sequence of commands different from the first sequence of commands dependent upon the associated commands, wherein at least one command of the first sequence of commands is excluded from the second sequence of commands dependent upon the metadata in the at least one command;
      promote execution of a given command from the first sequence of commands over at least one other command in the second sequence of commands in response to a determination that a time lapsed from receipt of the given command is greater than a threshold time, wherein the time lapsed from receipt of the given command is determined dependent upon metadata in the given command; and
      execute the second sequence of commands in the non-volatile memory.

9. The system of claim 8, the memory controller further configured to temporarily store data from cells in the selected one data block into available cells in the non-volatile memory prior to executing the at least one erase command.

10. The system of claim 9, the memory controller further configured to:
   execute the at least one write command on the temporarily stored data to generate modified data for the selected one data block; and
   write the modified data to the selected one data block using a single write command.

11. The system of claim 8, the memory controller further configured to store the first sequence of commands and the second sequence of commands in the buffer.

12. The system of claim 8, the memory controller further configured to receive, from a processor, the first sequence of commands and the second sequence of commands.

13. The system of claim 8, wherein the first sequence of commands is received through a serial Advanced Technology Attachment (ATA) bus.

14. The system of claim 8, wherein the multi-step operation corresponds to a request to save a file to the non-volatile memory.

15. A computer program product encoded on a tangible, non-transitory storage medium, the product comprising computer readable instructions for causing one or more processors to perform operations on a non-volatile memory, wherein the non-volatile memory includes a plurality of data blocks, the operations comprising:

receiving a first sequence of commands for a non-volatile memory, wherein the first sequence of commands includes at least one write command and at least one erase command wherein the at least one write command and the at least one erase command specify a selected one data block of the non-volatile memory;

associating two or more commands of the first sequence of commands dependent upon metadata included in each of the two or more commands of the first sequence of commands, wherein the metadata in each of the two or more commands indicates the two or more commands relate to a multi-step operation;

determining a second sequence of commands different from the first sequence dependent upon the associated commands, wherein at least one command of the first sequence of commands is excluded from the second sequence of commands dependent upon the metadata in the at least one command;

promoting execution of a given command from the first sequence of commands over at least one other command in the second sequence of commands in response to a determination that a time lapsed from receipt of the given command is greater than a threshold time, wherein the time lapsed from receipt of the given command is determined dependent upon metadata in the given command; and executing the second sequence of commands in the non-volatile memory.

16. The computer program product of claim 15, the instructions further comprising temporarily storing data from cells in the selected one data block into available cells prior to executing the at least one erase command.

17. The computer program product of claim 16, the instructions further comprising:

executing the at least one write command on the temporarily stored data to generate modified data for the selected one data block; and writing the modified data to the selected one data block using a single write command.

18. The computer program product of claim 15, the instructions further comprising storing the first sequence of commands and the second sequence of commands in a buffer.

19. The computer program product of claim 15, the instructions further comprising receiving, from the one or more processors, the first sequence of commands and the second sequence of commands.

20. The computer program product of claim 15, wherein the first sequence of commands is received through a serial Advanced Technology Attachment (ATA) bus.

21. The computer program product of claim 15, wherein the multi-step operation corresponds to a request to save a file to the non-volatile memory.

* * * * *